US010437454B2

(12) United States Patent
Flynn, III et al.

(10) Patent No.: US 10,437,454 B2
(45) Date of Patent: Oct. 8, 2019

(54) DYNAMICALLY SCALED NAVIGATION SYSTEM FOR SOCIAL NETWORK DATA (75) Inventors: William Joseph Flynn, III, San Francisco, CA (US); Michael Dudley Johnson, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 383 days.

(21) Appl. No.: 13/544,394

(22) Filed: Jul. 9, 2012

(65) Prior Publication Data
US 2014/0013243 A1  Jan. 9, 2014

(51) Int. Cl.
*G06F 3/0488* (2013.01)
*G06F 3/0485* (2013.01)
*G06F 16/44* (2019.01)

(52) U.S. Cl.
CPC ........ *G06F 3/0488* (2013.01); *G06F 3/04855* (2013.01); *G06F 16/447* (2019.01)

(58) Field of Classification Search
CPC .. G06F 3/04855; G06F 3/0488; G06F 3/0485; G06F 3/04883
USPC .................. 715/753, 787, 833, 784; 345/173
See application file for complete search history.

(56) References Cited

U.S. PATENT DOCUMENTS

| | | | |
|---|---|---|---|
| 6,976,228 B2 | 12/2005 | Bernhardson | |
| 7,136,096 B1 | 11/2006 | Yamagishi et al. | |
| 7,248,269 B2 | 7/2007 | Card et al. | |
| 7,656,429 B2 | 2/2010 | Larson | |
| 7,827,208 B2 | 11/2010 | Bosworth et al. | |
| 8,171,128 B2 | 5/2012 | Zuckerberg et al. | |
| 2002/0149677 A1 | 10/2002 | Wright | |
| 2006/0240856 A1 | 10/2006 | Counts et al. | |
| 2008/0307345 A1* | 12/2008 | Hart | G06F 11/1448 715/769 |
| 2009/0144661 A1 | 6/2009 | Nakajima et al. | |
| 2010/0105440 A1 | 4/2010 | Kruzeniski et al. | |
| 2010/0298034 A1* | 11/2010 | Shin | G06F 3/04883 455/566 |
| 2010/0306648 A1* | 12/2010 | Wilairat | G06F 3/0488 715/702 |
| 2011/0035700 A1* | 2/2011 | Meaney | G06F 3/048 715/784 |
| 2011/0154196 A1* | 6/2011 | Icho et al. | 715/702 |
| 2012/0131507 A1* | 5/2012 | Sparandara | G06F 19/322 715/833 |

(Continued)

OTHER PUBLICATIONS

Lessin, S., et al., U.S. Appl. No. 13/239,347, filed Sep. 21, 2011, 82 pages.

*Primary Examiner* — Amy Ng
*Assistant Examiner* — Mong-Shune Chung
(74) *Attorney, Agent, or Firm* — Fenwick & West LLP (57) ABSTRACT

A user interface includes a tactile interface on a client device that allows users to interact with social networking system content in a manner that is optimized for touch screens and/or devices with limited display area. Stories associated with social networking system users and times are displayed in a scrollable list along with a timeline scrubber identifying different time periods. A position indicator is displayed proximate to the timeline scrubber to identify the time period including one or more times associated with displayed stories. Responsive to received input, details about time intervals included in a time period are displayed or the timeline scrubber appearance is modified to distinguish certain time periods.

10 Claims, 6 Drawing Sheets

(56) References Cited

U.S. PATENT DOCUMENTS

| | | | |
|---|---|---|---|
| 2012/0139935 A1* | 6/2012 | Miyasaka | G06F 3/0488 345/589 |
| 2012/0166532 A1 | 6/2012 | Juan et al. | |
| 2012/0200567 A1* | 8/2012 | Mandel et al. | 345/420 |
| 2012/0308204 A1* | 12/2012 | Hwang | 386/241 |
| 2013/0031507 A1 | 1/2013 | George | |
| 2013/0080954 A1* | 3/2013 | Carlhian et al. | 715/769 |

\* cited by examiner

DYNAMICALLY SCALED NAVIGATION SYSTEM FOR SOCIAL NETWORK DATA

BACKGROUND

This invention relates generally to social networking system user interfaces and, in particular, to mobile and tactile interfaces for presenting social networking system information.

Social networking systems capture large volumes of information from various sources that are of interest to users. For a given user this information may include, for example, social data related to the user and her social connections, news related to the user's interests, entertainment selected for the user, and updates from the user's social connections. Previously, users interacted with social networking systems through interfaces that were displayed on personal computer (PC) screens. However, an increasing number of users interact with social networking systems through mobile devices having limited display areas, such as smartphones, tablets, etc.

Because the volume of social networking system information is large and continuously generated, it is often impractical to display this information on a mobile device using interfaces adapted from PC interfaces. Conventional PC user interfaces display information using thumbnails and buttons that are relatively small compared to the total user interface area, but are poorly adapted to the smaller display areas of smartphones. The small screen size of touch screen smart phones makes it difficult to navigate and select data in interfaces that are designed for larger display areas. In addition, PC-based interfaces designed for operation by mouse and keyboard do not often migrate well to touch screens and other tactile interfaces commonly used by mobile devices where touch and gestures are the primary mode of interaction.

Further, the large volumes of social data presented to users by a social networking system often require users to navigate through many pages of data before identifying the data of interest. On mobile devices, where display screens are relatively small, navigation through pages of data is either too slow to effectively traverse large quantities of data or fast but not precise enough to efficiently interact with specific items in large lists.

SUMMARY

To allow users to more easily navigate and access social networking data on devices with limited display areas, a social networking system uses a tactile interface to display social networking data. The tactile interface may be configured to simplify navigation of social networking data using devices having a touch-sensitive display, or "touch screen," and limited display area, such as a smartphone or tablet computer. The tactile interface allows users to scroll through social networking system stories, where each story includes a list of content that may be of interest to a user and is associated with a time. To simplify user navigation, the social networking system displays stories in a chronologically ordered list, or "timeline," based on the times associated with the stories.

To allow users to quickly and efficiently locate content of interest to them in the timeline, a timeline scrubber is displayed proximate to the chronological list of stories. For example, the timeline scrubber is displayed on a side of the display presenting the chronological list of stories. The timeline scrubber displays a plurality of time period divisions each representing time periods. For example, time period divisions may represent different years, months, weeks or days. Interacting with the portion of a display including the timeline scrubber modifies the displayed chronological list of stories to include one or more stories having times within a time period associated with a time period division proximate to the portion of the display with which an interaction was received.

Interacting with the timeline scrubber may also cause display of a magnified time period viewer. When a user interacts with a particular time period division on the timeline scrubber, the magnified time period viewer displays smaller time intervals within that time period division, allowing the user to view and interact with the smaller time intervals for greater accuracy in selecting a time range. Hence, the magnified time period viewer allows users to more accurately select small time intervals to more efficiently view stories of interest.

Figure 1:
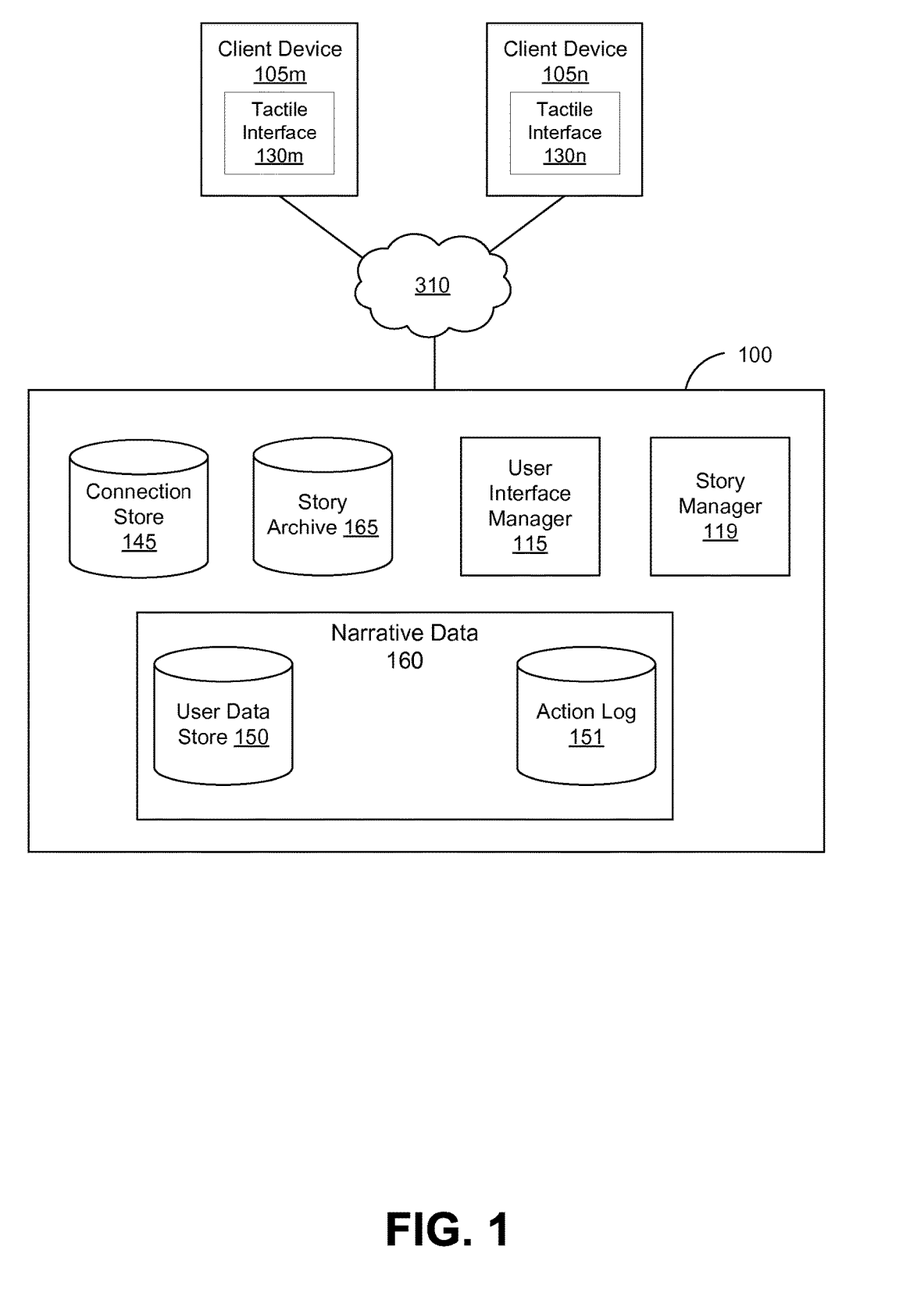
FIG. 1 is a diagram of a system environment for presenting a tactile interface to users of a social networking system, in accordance with an embodiment of the invention.

FIG. 1 and the other Figures use like reference numerals to identify like elements. A letter after a reference numeral, such as "130A," indicates that the text refers specifically to the element having that particular reference numeral. A reference numeral in the text without a following letter, such as "130," refers to any or all of the elements in the Figures bearing that reference numeral (e.g. "130" in the text refers to reference numerals "130A" and/or "130B" in the figures).

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system gathers and stores information related to its users and social connections between users. The social networking system may make this information available to its users through an interface that is adapted for use with devices having small form factors and/or touch screens. In one embodiment, the social networking system generates stories and story aggregations about its users based upon data in the social networking system, and generates displayable representations of selected stories and story aggregations, which are dispatched to client devices for display to social networking system users. The interface used to display these representations interface has several components enabling efficient and intuitive access to the information in the stories and story aggregations, including a dynamically scaled timeline scrubber.

System Overview

FIG. 1 is a diagram of a system environment for presenting a tactile interface to users of a social networking system 100. The users interact with the social networking system 100 using client devices 105. Some embodiments of the systems 100 and 105 have different and/or other modules than the ones described herein, and the functions can be distributed among the modules in a different manner than described here.

Interactions between the client devices 105 and the social networking system 100 are typically performed via a network 310, for example, via the internet. The network 310 enables communications between the client device 105 and the social networking system 100. In one embodiment, the network 310 uses standard communications technologies and/or protocols. For example, the network 310 includes communication channels using one or more technologies such as Ethernet, 802.11, worldwide interoperability for microwave access (WiMAX), 3G, 4G, LTE, digital subscriber line (DSL), asynchronous transfer mode (ATM), InfiniBand, PCI Express Advanced Switching, etc.

The social networking system 100 offers its users the ability to communicate and interact with other users of the social networking system 100. Users join the social networking system 100 and then add connections to other users of the social networking system 100 to whom they wish to be connected. These connected users are called the "friends" of the user. When a user joins the social networking system 100 they may create a user account, enabling the user to maintain a persistent and secure identity on the social networking system 100. The user account may include a user profile that stores details about the user, such as name, age, sex, etc. The social networking system 100 may provide a stream of data to a user to keep the user updated on the activities of the user's friends, as well as to inform the user about news and information related to the user's interests. This stream of data may include stories and story aggregations. The stories are collections of related data that are presented together to a user. Stories and story aggregations are discussed in more detail herein.

In one embodiment, the client device 105 used by a user for interacting with the social networking system 100 can be a personal computer (PC), a desktop computer, a laptop computer, a notebook, tablet PC, a personal digital assistant (PDA), mobile telephone, smartphone, internet tablet, or any similar device with a display and network communication capability. These devices may include a camera sensor that allows image and video content to be captured and uploaded to the social networking system 100. These devices may also have a touch screen, gesture recognition system, mouse pad, or other input device allowing a user to interact with the social networking system 100 through a tactile interface 130, which is discussed in more detail herein.

The social networking system 100 maintains different types of data objects, for example, user data objects, action objects, and connection objects. A user data object stores information related to a user of the social networking system 100. For example, a user data object may store a user's date of birth, a photo of the user, a reference to a photo of the user or any other information associated with the user. User data objects are stored in the user data store 150. A connection object stores information describing the relationship between two users of the social networking system or, in general, describing a relationship between any two entities represented in the social networking system 100. Connection objects are stored in the connection store 145. An action object stores information related to actions performed by users of the social networking system 100. Almost any activity of a user of a social networking system 100 may be stored as an action. For example, an action can be the posting of a new comment or status update or forming a connection to another user. Action objects are stored in the action log 151. The user data in the user data store 150 and the action objects in the action log 151 are collectively called the narrative data 160.

The social networking system 100 may maintain a social graph that tracks the relationship between the various objects, users, and actions captured by the social networking system 100. In one embodiment, the users, user data, and other entities, exist as nodes in the social graph, with edges connecting nodes to each other. In this embodiment, have different types corresponding to different types of actions taken by users of the social networking system 100. For example, a node representing a photograph stored in the social networking system 100 may have an edge to a node representing the user that uploaded the photograph, and this edge may be an "uploaded by" action. The same photograph may have edges to several other nodes representing the users in that photograph, and these edges may be "tagged in" actions. Similarly, a node representing a user in the social networking system 100 may have edges to nodes representing posts made by that user. These edges may all be "posted by" actions.

The social networking system 100 may maintain or compute a measure of a user's "affinity" for other users (or objects) in the social networking system 100. The measure of affinity may be expressed as an affinity score for a user, which represents that user's closeness to another user (or object) of the social networking system 100. The affinity score of a user X for another user Y can be used to predict, for example, if user X would be interested in viewing or likely to view a photo of user Y. The affinity scores can be computed by the social networking system 100 through automated methods, including through predictor functions, machine-learned algorithms, or any other suitable algorithm for determining user affinities. The social networking system 100 may store an archive of historical affinity scores for a user as their affinity scores for various users and objects changes over time. Systems and methods for computing user affinities for other users of a social networking system 100, as well as for other objects in the system, are disclosed in U.S. application Ser. No. 12/978,265, filed on Dec. 23, 2010, which is incorporated by reference in its entirety.

The social networking system 100 also comprises a user interface manager 115, which provides the server-side functionality allowing user interaction with the social networking system 100. For example, the user interface manager 115 provides functionality allowing users of the social networking system 100 to interact with the social networking system 100 via the tactile interface 130. When users request information from the social networking system 100, the user interface manager 115 dispatches the requested information to users in a format for presentation via a tactile interface 130 of a client device 130. For example, when a user requests a news feed from the social networking system 100, the user interface manager 115 may send stories and story aggregations to the client devices 105 that are configured to be displayed on the tactile interface 130 on that device. Depending on the type of information requested by a user, the user interface manager 115 may send stories, story aggregations, profile pages, timelines, or other data to the client device 105. Stories, story aggregations, profile pages, and timelines are discussed in more detail herein.

The client device 105 executes instructions to implement a tactile interface 130 allow the user to interact with the social networking system 100 via an input device of the client device 105. The tactile interface 130 allows the user to perform various actions associated with the social networking system 100 and to view information provided by the social networking system 100. For example, the tactile interface 130 allows a user to add connections, post messages, post links, upload images or videos, update the user's profile settings, view stories, and the like. The information provided by the social networking system 100 for viewing by the tactile interface 130 includes images or videos posted by the user's connections, comments posted by the user's connections, messages sent to the user by other users, and wall posts.

In an embodiment, the tactile interface 130 is presented via a mobile browser application that allows a client device user to retrieve and present information from the internet or from a private network. In this embodiment the HTML, JAVASCRIPT, and other computer code necessary to implement the tactile interface 130, may be provided by the user interface manager 115. In a different embodiment, the tactile interface 130 is a mobile app running on a client device 105 such as a smart phone or tablet. In this embodiment the computer code executed to implement the tactile interface 130 may be downloaded from a third-party server (such as an application store) and stored by the client device 105, but the data presented in the tactile interface 130 and the code for formatting this data is received from the user interface manager 115.

When a user 'A' views the data of another user 'B' the first user 'A' is called the "viewing user," and the second user 'B' is called the "subject user." The tactile interface 130 allows viewing users to view the data of other subject users of the social networking system 100 as well as general data related to news, sports, interests, etc. Information in the tactile interface 130 may be presented to viewing users in different views. For example, the social data of subject users can be presented to viewing users by way of a "profile page," which is an arrangement of the users' social networking data. The information about subject users may also be presented in the form of a news feed or timeline containing stories. In one embodiment, the different views comprise data and code in a web standard format presented through a browser. For example, a news feed may be a combination of any of XML, HTML, CSS, Javascript, plaintext and Java sent from a server to a web browser running on a client device 105. In another embodiment, a news feed is data formatted for presentation through a mobile app or desktop application.

A social network story (or "story") is an aggregation of data gathered by the social networking system 100 that is configured for display in various social networking system views (user interface views). For example, stories may be presented to viewing users in a continuously updated real-time newsfeed, a timeline view, a user's profile page or other format presented in a web browser. A "story aggregation" is a collection of one or more stories gathered together for display. For example, all the stories related to a particular event, such as a birthday party, may be aggregated into one story aggregation.

The story manager 119, included in the social networking system 100, manages the story generation process. In one embodiment, the story manager 119 comprises many different types of story generators configured to generate stories for different purposes (i.e., different views), which are stored in the story archive 165. Story generators are configured to generate stories for a particular target view, and may restrict the selection of narrative data used for story generation based on the target view. For example, a story generator may be configured to generate stories for a photo album view, and based on this purpose it may restrict the narrative data that it uses to generate stories to narrative data that contains or references images. Stories generated for display in a tactile interface 130 may include different data than stories generated to be displayed in a desktop PC interface and may be differently visually formatted to optimize for the differences between a PC display and tactile display (e.g., larger icons for a smaller smartphone screen). In some embodiments, the story manager 119 may restrict the stories provided to a viewing user to stories including data related to connections of the viewing user (i.e., to stories including data about subject users that are connected to the viewing user in the social networking system 100).

A newsfeed may be generated by the story manager 119 and provided to a viewing user. The newsfeed is a scrollable list of recent stories most relevant to a viewing user. Relevance may be determined by the story manager 119 based on affinity or other factors. The story manager 119 may also, or alternatively, generate a timeline, which is a chronological list of stories related to a particular subject user that are ordered by time period. In some embodiments, a timeline may alter the ranking of some stories depending on other factors such as social importance or likely engagement value. Stories that are configured for display in a timeline are also called timeline units. A timeline may also include special "report" units, which are multiple timeline units that have been aggregated together. For example, a user may have several wall posts from friends during the month of November. That user's timeline can then include a report unit containing all posts from friends during that month. For newsfeeds and timelines there may be multiple story generators producing stories of different types that are displayed together. Generation of stories for a newsfeed from data captured by a social networking system 100 is disclosed in U.S. application Ser. No. 11/503,037, filed on Aug. 11, 2006, and U.S. application Ser. No. 11/502,757, filed on Aug. 11, 2006, which are incorporated by reference in their entirety. Timelines and timeline units are discussed in more detail in U.S. application Ser. No. 13/239,347, filed on Sep. 21, 2011, which is also incorporated by reference in its entirety.

In some embodiments, the modules of the social networking system 100 are not contained within a single networking system but are found across several such systems. The social networking system 100 may communicate with the other systems, for example, using application programming interfaces (APIs). In these embodiments, some modules shown in FIG. 1 may run in the social networking system 100, whereas other modules may run in the other systems. For example, in one embodiment the user data store 150 and action log 151, may run on some external networked database system outside the social networking system 100.

Tactile Interface Details

Figure 2:
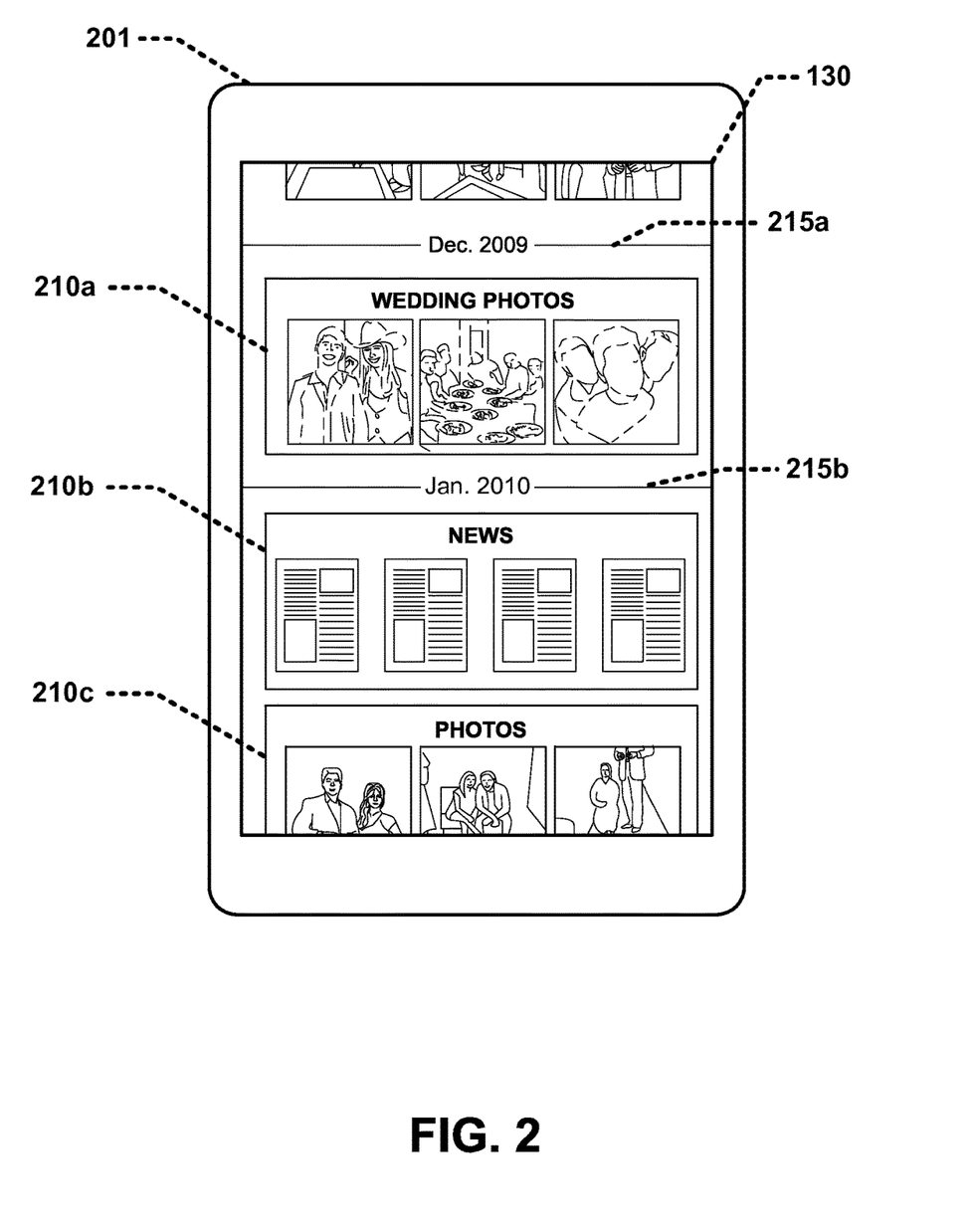
FIG. 2 illustrates one embodiment of a tactile interface displaying social networking system stories on a mobile device.

FIG. 2 is a diagram illustrating one example embodiment of a tactile interface 130 displayed on a mobile device 201. In this embodiment, the tactile interface 130 includes several stories 210 in a scrollable list. In FIG. 2, the stories 210 are timeline units related to a single user and are arranged in a timeline, where the distinct time periods are delineated by time period separators 215. For example, the December 2009 time period separator 215a has a single story 210a below it, where the story 210a includes wedding photos from December 2009. The January 2010 time period separator 215b has two stories visible (others may be off screen, but may be revealed by scrolling). One story 210b includes news from January 2010, while the other story 210c is another photo story including photographs from January 2010. In other embodiments, there may be story aggregations in place of one or more of the stories 210. For example, the story aggregations display stories as a horizontal list, similar to the way that stories 210 display content in a horizontal list.

Figure 3A:
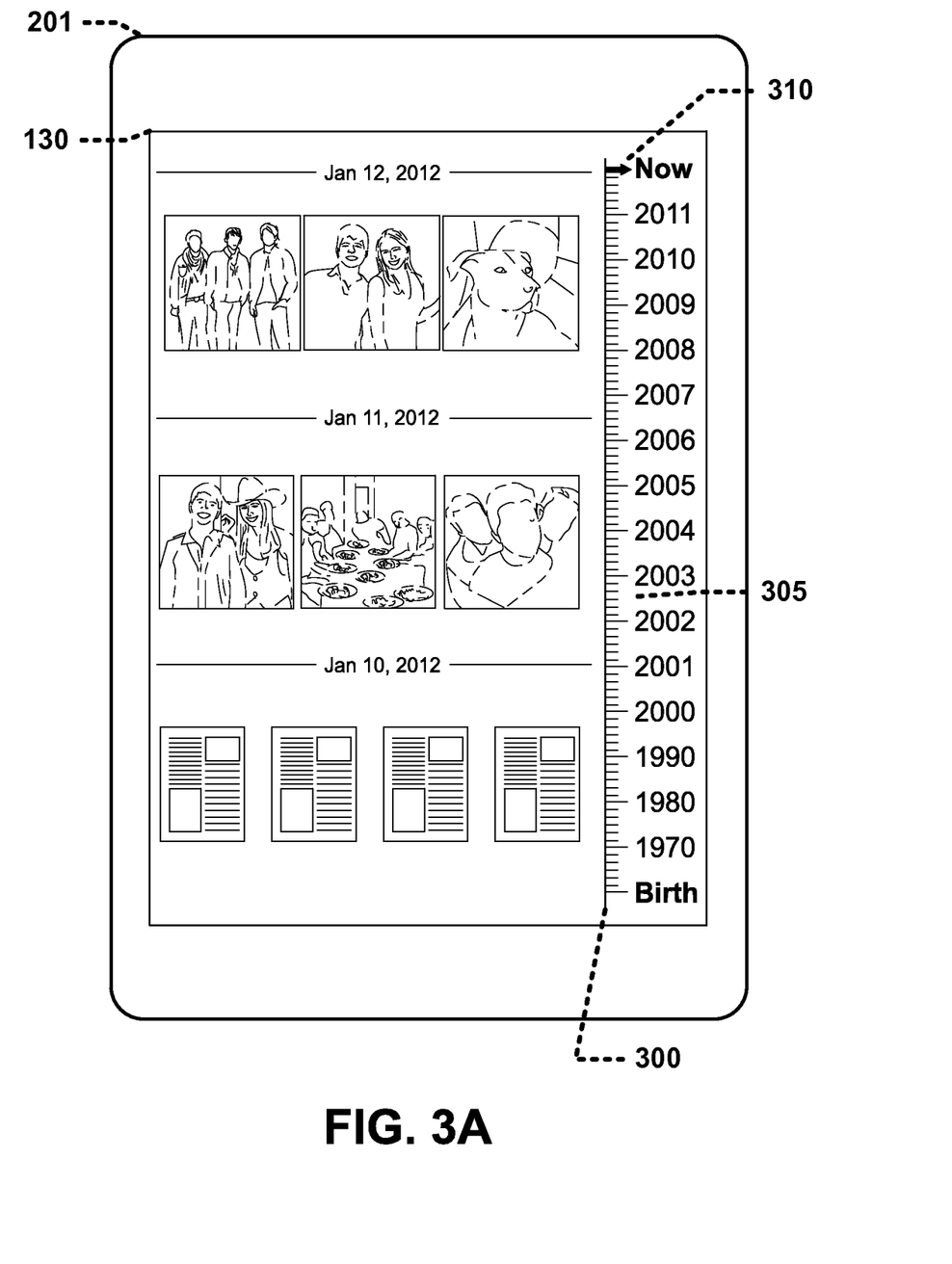
FIGS. 3A and 3B illustrate one embodiment of a scrolling interface employed by a tactile interface on a mobile device.

The tactile interface 130 may also display a timeline scrubber alongside the displayed stories. FIG. 3A illustrates one embodiment of a timeline scrubber 300 displayed on a tactile interface 130 of a mobile device 201. The timeline scrubber 300 is an interface element that provides information on both the time period of the current stories displayed and the range of time periods available to view. The timeline scrubber 300 has a series of time period divisions 305 marked on it. The time period divisions 305, like notches on a scale or ruler, show the divisions of time on the timeline scrubber 300. Unlike notches on a scale or ruler, however, the time period divisions 305 on the timeline scrubber 300 are dynamically positioned and scaled. The dynamic positioning and scaling of the time period divisions 305 is discussed in more detail herein. Some, but not necessarily all, time period divisions 305 may have a time period indicator beside them. The time period indicators act as labels displaying the time periods that the time period divisions 305 represent. The time period indicators may be numeric (e.g. "1990"), alphanumeric (e.g. Monday 14$^{th}$), or purely symbolic (e.g. icon for a holiday).

The embodiment of the tactile interface 130 in FIG. 3A allows a viewing user to vertically scroll through content using a touch-based interface. If there are many stories on a subject user's timeline, the tactile interface 130 may display a subset of the stories at any given time, while the remainder of stories are not displayed. Stories and content may be partially occluded by the boundaries of the screen or tactile interface 130, new stories and content that are not currently displayed are revealed responsive to the tactile interface 130 receiving inputs, such as scrolling gestures, from a user.

If the tactile interface 130 is implemented on a touch screen, gestures from the user captured by the touch screen are used to navigate the content presented by the tactile interface 130. For example, receiving a vertical swipe gesture may cause the tactile interface 130 to navigate to stories from time periods earlier or later than the time period currently displayed. Other interface systems may use different gestures or inputs to activate vertical scrolling. The timeline scrubber 300 includes a position marker 310 that is situated with respect to a time period division to indicate the time period of the currently displayed subset of stories (the displayed time period division). In the example of FIG. 3A, the position marker 310 appears as a bold arrow on the time period division corresponding to the time period of the currently displayed subset of stories, however, in other embodiments different schemes may be used to visually distinguish the displayed time period division from other time period divisions 305. As a user scrolls through content on the tactile interface 130, the position marker 310 visually distinguishes a new time period division 305 on the timeline scrubber 300 to indicate the time period corresponding to the displayed subset of stories.

In one embodiment, the timeline scrubber 300 is continuously visible on the tactile interface 130. Alternatively, the timeline scrubber 300 is visible responsive to the tactile interface 130 receiving a user input, such as an input to scroll through content on the tactile interface 130, and is otherwise not displayed. When a user interacts with a particular location on the timeline scrubber 300, the tactile interface 130 displays stories from the time period associated with the location on the timeline scrubber 300 with which the user interacted. Hence, the user may directly jump to a new time period and view stories from this time period without manually scrolling through the timeline scrubber 300.

Figure 3B:
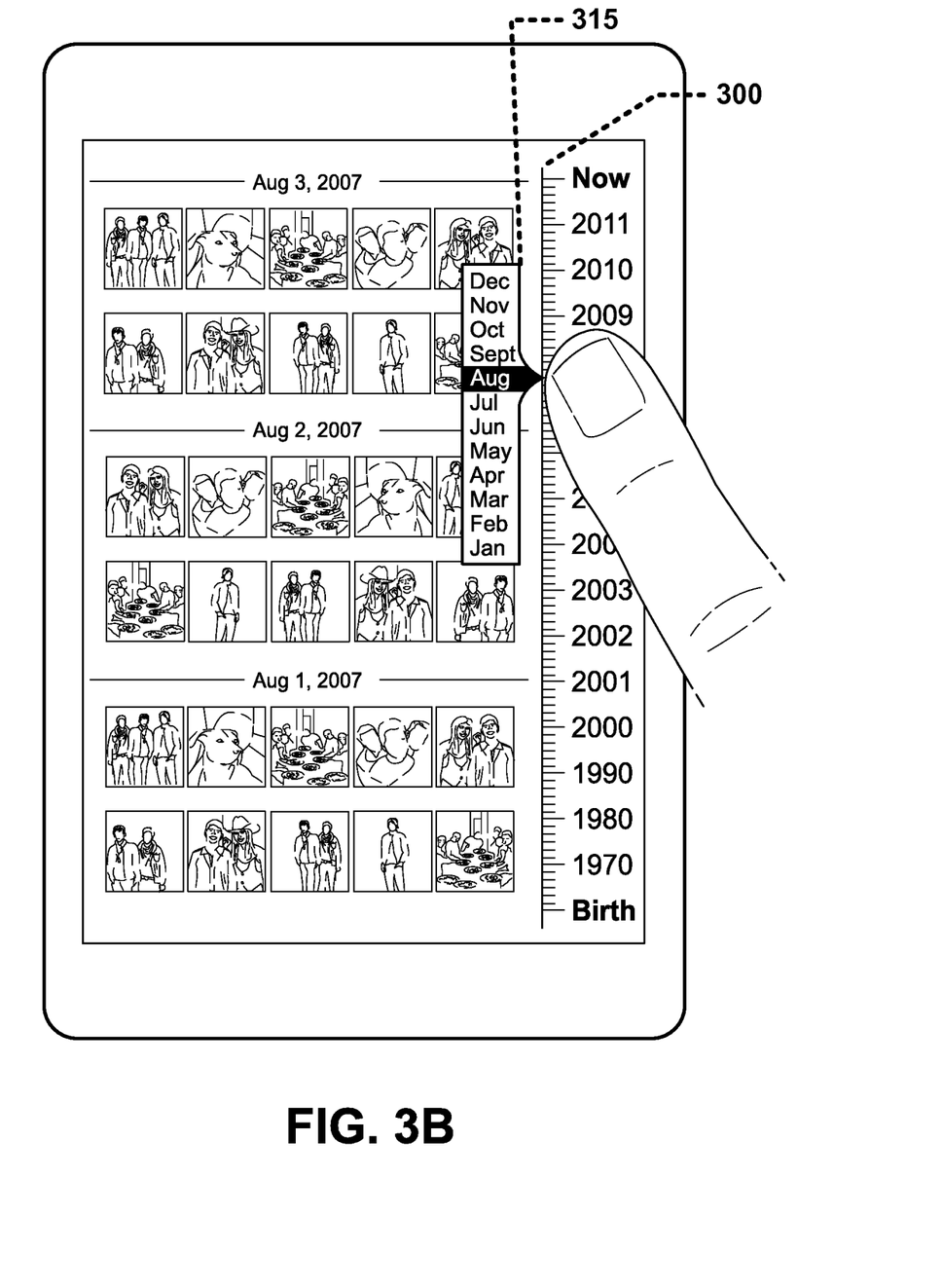

The tactile interface may temporarily display additional interface elements to allow the user to more easily select a particular time period from the timeline scrubber 300. For example, as illustrated in FIG. 3B, a magnified time period viewer 315 may be displayed responsive to receiving one or more user inputs. For example, the magnified time period viewer 315 is displayed responsive to the tactile interface 130 receiving an input that directly interacts with the timeline scrubber 300. As another example, the magnified time period viewer 315 is displayed responsive to the tactile interface 130 receiving an input that contacts a location of the timeline scrubber 300 for a specified length of time. The magnified time period viewer 315 shows a more detailed view of the time periods associated with the location of the user's interaction with the timeline scrubber 300.

In the embodiment of FIG. 3B, a user contacts a portion of a touch screen associated with a time period division 305 of the timeline scrubber 300 corresponding to August 2009, so the magnified time period viewer 315 displays the time period division 305 with which the user interacted as well as surrounding time periods. In FIG. 3B, the time period division 305 with which the user interacted, the month of August, is visually distinguished from the other time periods shown in the magnified time period viewer 315, and as user interaction with different locations on the timeline scrubber 300 is received, to select a new time period, the visually distinguished time period in the magnified time period viewer 315 changes to reflect the time period division 305 on the timeline scrubber 300 with which the user is currently interacting. The position marker 310 may also move to the location on the timeline scrubber 300 with which the user is currently interacting and the stories displayed in the tactile interface 130 may also change to reflect the time period corresponding to the location on the timeline scrubber 300 with which the user is currently interacting.

In one embodiment, the magnified time period viewer 315 displays story indicators in addition to time periods. The story indicators visibly show information related to stories associated with the time periods that are displayed in the magnified time period viewer 315. For example, the magnified time period viewer 315 may display icons for life events that have occurred during the time periods displayed in the viewer 315 (e.g. graduations, weddings, birthdays, etc.). In another embodiment, the user may interact with a time period or story indicator displayed within the magnified time period viewer 315 to cause stories associated with the time period or indicator to be displayed in the tactile interface 130.

Dynamic Scaling and Positioning

Figure 4A:
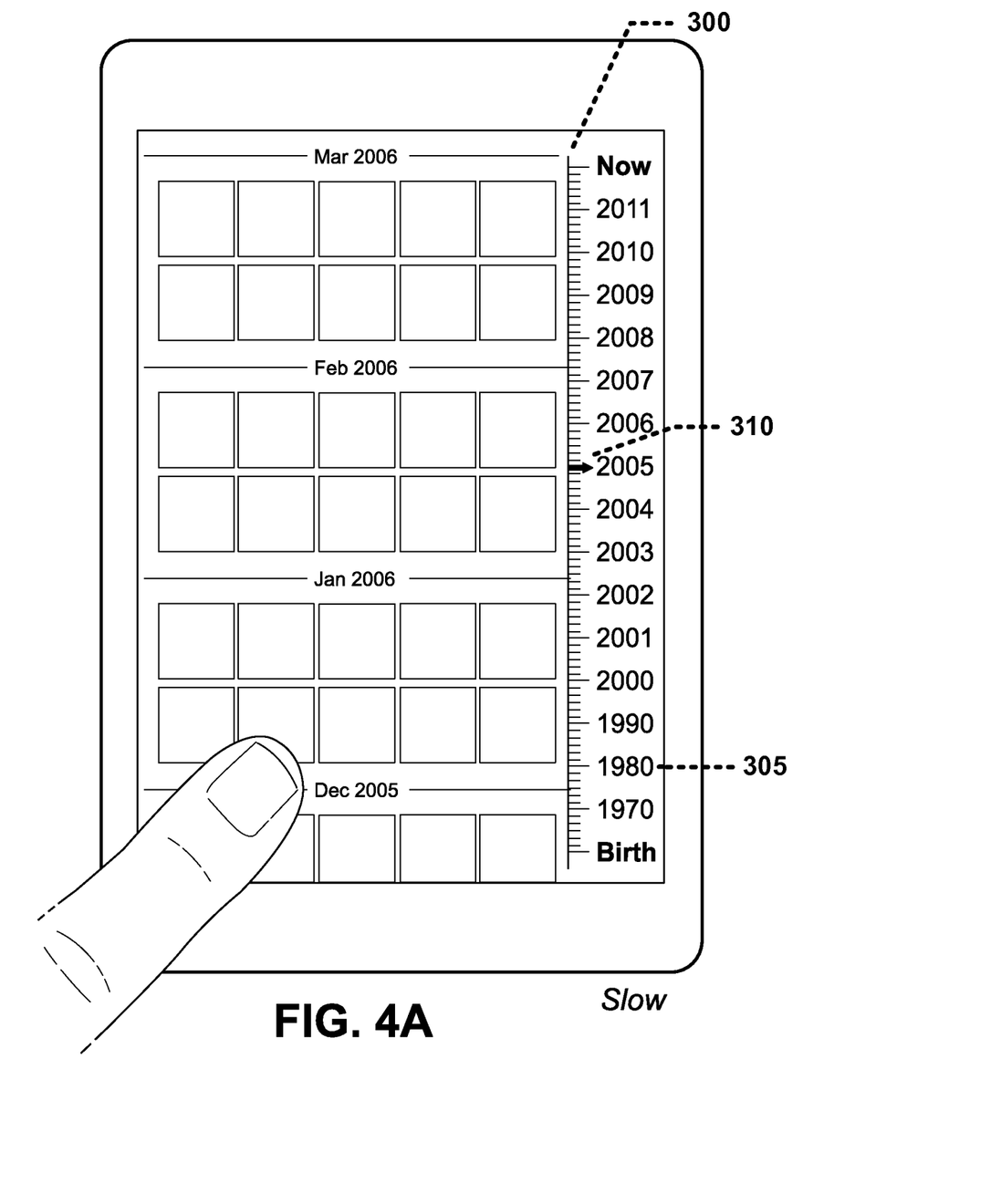
FIGS. 4A and 4B illustrate the operation of one embodiment of a timeline scrubber with dynamically scaled time period divisions.

As mentioned previously, the time period divisions 305 may be dynamically scaled and positioned to aid in user navigation through stories using the tactile interface 130. FIG. 4A illustrates an example of user interaction with the tactile interface 130. As shown in FIG. 4A, the timeline scrubber 300 is visible on the right-side of a touch screen as an inverted vertical scale having a starting time and an ending time. In the example of FIG. 4A, the starting time is identified as "Birth" and the ending time is identified as "Now." Between the starting time and the ending time, the timeline scrubber 300 divides time into time periods that are designated by time period divisions 305. In some embodiments, the time period divisions 305 do not represent equal periods of time. For example, in FIG. 4A, the time period divisions 305 within a specified distance or length of time from to the starting time ("Birth") represent decades (1970, 1980, 1990, etc.) while the remaining time period divisions 305 represent years. The timeline scrubber 300 may devote a larger portion of its space to time intervals closer to the current time, or to more recent time intervals, as users may be more interested in more recent stories. For example, the timeline scrubber 300 devotes more space to more recent years. In some embodiments, the time period divisions 305 designating years in which events (such as weddings, graduations, etc.) occurred to the subject user may be visually distinguished from other years to draw the user's attention to them.

The time period divisions 305 that are displayed and the space between each time period division 305 may also depend on the currently displayed time period. The time period divisions closest to the currently displayed time period—i.e. closest to the position marker 310 indicating the current time period—may be visually distinguished from other time period divisions 305. For example, time period divisions within a specified time interval from the currently displayed time period are highlighted using a different color, geometry, or scaling on the timeline scrubber 300 than the other time period divisions. Similarly, time period divisions 305 that are beyond a specified time interval from the currently displayed time period may also be visually distinguished, such as displayed in a smaller scale or in a different color than other time period divisions 305.

Figure 4B:
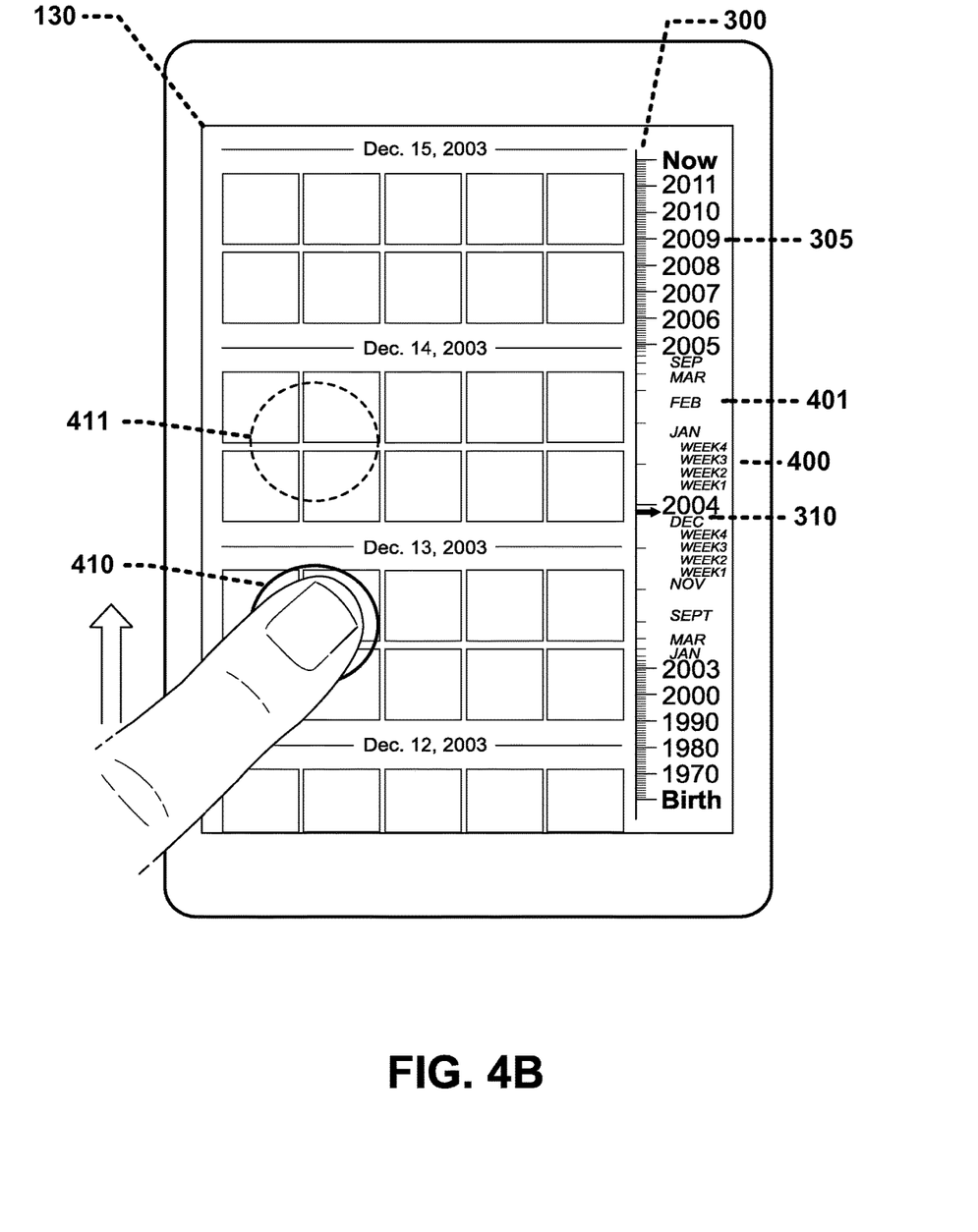

FIG. 4B illustrates one embodiment of a timeline scrubber 300 with time period divisions 305 that are dynamically scaled and positioned. In this embodiment, the user interacts with the tactile interface 130 by contacting a touch screen displaying the tactile interface 130. However, in other embodiments, any suitable input mechanism may be used. Examples of alternative input mechanisms include a mouse-driven input method, a motion-driven input method, a camera-driven input method, a keyboard-driven input method, or another suitable input method. In FIG. 4B, a user contacts with the touch screen at interaction point 410 and performs a touch gesture that moves to interaction point 411 while contacting the touch screen. This gesture scrolls the content displayed by the touch screen in an upward direction, changing the displayed subset of stories to an earlier time period. In the example of FIG. 4B, the illustrated touch gesture causes stories near Dec. 12, 2003 to be displayed. The position marker 310 shows the location in the timeline scrubber 300 of the currently displayed time period. Time period divisions within a specified distance of the position marker 310 or within a specified time or otherwise proximate to the currently displayed time period (proximate time divisions 400) may be visually distinguished from other time period divisions 305. For example, proximate time period divisions 400 near the position marker 310 are displayed in a larger size than the other time period divisions 305.

In one embodiment, proximate time period divisions 400 near the position marker 310 are not only visually distinguished from other time divisions 305, but also represent different units of time than other time period divisions 305. For example, proximate time period divisions 400 represent smaller units of time (weeks) than other time period divisions 305 (which represent years or decades). The time period indicators that label these proximate time period divisions 400 are changed to display these different units of time. In one embodiment, the spacing between the time period divisions gradually diminishes as the distance between the position marker 310 and the time period divisions increases. For example, FIG. 4B shows time period divisions 400 nearest to the position marker 310, which represent weeks, using a first spacing and shows time period divisions 401 further than a specified distance from the position marker 310, which represent months, using a different spacing. For example, proximate time period divisions 400 within a specified distance of the position marker 310 that represent weeks have a wider spacing than proximate time period divisions 401 beyond the specified distance of the position marker 310 that represent months. Varying the spacing between time period divisions 305 allows a user to more precisely select a time period for viewing. For example, it would be nearly impossible to select a precise week in 2003 to view if the time period divisions for the currently displayed time period remained scaled in years, especially on a smaller mobile device screen.

The scaling (spacing) of the time period divisions 305 may be based on attributes of input received by the tactile interface 130. For example, the spacing of the time period divisions 305 is proportional to the speed of a swiping gesture received by the tactile interface 130. Slow swiping or scrolling (e.g., swiping having a scrolling rate below a threshold value) will often indicate that a user is attempting to locate a particular time period with precision, while fast scrolling or swiping (e.g., swiping having a scrolling rate equaling or exceeding the threshold value) usually indicates that a user is trying to quickly move through time periods. Using this information the tactile interface 130 may adjust the scaling and position of the time period divisions to aid the user in their navigation. For example, a slow vertical swipe across the tactile interface 130 may cause the time period divisions 305 within a specified interval from the currently displayed time period to expand, such that there is more space between them, so that a user may select a particular time period division 305 with greater precision. On the other hand, the system may compress the spacing between time period divisions 305 if the user is scrolling quickly.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   selecting a subset of stories associated with users of a social networking system, each story of the subset of stories associated with a time;
   displaying on a touch screen display of a mobile device a timeline interface to a user of the social networking system, the timeline interface comprising:
     a scrollable list including the subset of stories presented in a chronological order according to the time associated with each story of the subset of stories;
     a timeline scrubber adjacent to the scrollable list, the timeline scrubber having a plurality of selectable time period divisions, each selectable time period division associated with a range of times; and
     a position marker adjacent to a selectable time period division of the plurality of selectable time period divisions;
   receiving, on a portion of the scrollable list including the subset of stories, an input via the touch screen to navigate through the scrollable list at a first scroll rate;
   responsive to receiving the input:
     modifying the subset of stories included in the scrollable list based on the first scroll rate so a modified scrollable list including stories associated with one or more different times is displayed;
     expanding, based on a comparison of the first scroll rate to a predetermined value, a first selectable time period division of the plurality of selectable time period divisions corresponding to a first range of times associated with one or more of the modified subset of stories, wherein the expanding comprises:
       displaying, based on the first scroll rate, a plurality of selectable time intervals within the first selectable time period division, each time interval associated with a narrower range of times within the first range of times; and
       displaying the position marker adjacent to a selectable time interval corresponding to a time associated with one or more of the modified subset of stories;
   wherein the time intervals of the plurality of selectable time intervals within the first selectable time period division adjacent to the displayed position marker are displayed at an increased size.

2. The method of claim 1, further comprising adjusting a distance between time period divisions of the plurality of selectable time period divisions based on the first scroll rate, wherein the distance between the time period divisions of the plurality of selectable time period divisions is greater than zero.

3. The method of claim 1, further comprising increasing a display size of time period divisions of the plurality of selectable time period divisions within a specified distance of the position marker.

4. The method of claim 1, further comprising changing a display color of time period divisions of the plurality of selectable time period divisions within a specified distance of the position marker.

5. The method of claim 1, further comprising:
   displaying one or more time period indicators adjacent to one or more of the plurality of selectable time period divisions, the time period indicators of the one or more time period indicators comprising alphanumeric labels indicating time periods associated with the one or more time period divisions of the plurality of selectable time period divisions.

6. The method of claim 5, further comprising changing a visual appearance of time period indicators of the one or more time period indicators for time period divisions of the plurality of selectable time period divisions within a specified distance of the position marker.

7. The method of claim 1, wherein the input received via the touch screen is a gesture travelling along a vertical axis of the touch screen.

8. The method of claim 1, further comprising:
   responsive to receiving a timeline input to a portion of the touch screen corresponding to the timeline scrubber, displaying a detail time period viewer adjacent to one of the plurality of selectable time period divisions included in the timeline scrubber in the portion of the touch screen receiving the timeline input, the detail time period viewer separate from and non-overlapping with the timeline scrubber the detail time period viewer comprising:
     a plurality of selectable time intervals of the selected time period division, each time interval associated with a narrower range of times within the range of times associated with the selectable time period division associated with the portion of the touch screen receiving the timeline input.

9. A computer program product comprising a non-transitory computer-readable storage medium containing computer program code for performing the steps:
   selecting a subset of stories associated with users of a social networking system, each story of the subset of stories associated with a time;
   displaying on a touch screen display of a mobile device a timeline interface to a user of the social networking system, the timeline interface comprising:
     a scrollable list including the subset of stories presented in a chronological order according to times associated with each story of the subset of stories;

a timeline scrubber adjacent to the scrollable list, the timeline scrubber having a plurality of selectable time period divisions, each selectable time period division associated with a range of times; and a position marker adjacent to a selectable time period division of the plurality of selectable time period divisions;

receiving, on a portion of the scrollable list including the subset of stories, an input via the touch screen to navigate through the scrollable list at a first scroll rate;

responsive to receiving the input:

modifying the subset of stories included in the scrollable list based on the first scroll rate so a modified scrollable list including stories associated with one or more different times is displayed;

expanding, based on a comparison of the first scroll rate to a predetermined value, a first selectable time period division of the plurality of selectable time period divisions corresponding to a first range of times associated with one or more of the modified subset of stories where the expanding comprises:

displaying a plurality of selectable time intervals within the first selectable time period division, each time interval associated with a narrower range of times within the first range of times; and displaying the position marker adjacent to a time interval corresponding to a time associated with one or more of the modified subset of stories;

wherein the time intervals of the plurality of selectable time intervals within the first selectable time period division adjacent to the displayed position marker are displayed at an increased size.

10. The computer program product of claim 9, further comprising computer program code for:

displaying one or more time period indicators adjacent to one or more of the plurality of selectable time period divisions, the time period indicators of the one or more time period indicators comprising alphanumeric labels indicating time periods associated with the one or more time period divisions of the plurality of selectable time period divisions; and changing a visual appearance of time period indicators of the one or more time period indicators for time period divisions of the plurality of selectable time period divisions within a specified distance of the position marker.

* * * * *